United States Patent
Hungund et al.

(10) Patent No.: US 12,282,494 B1
(45) Date of Patent: Apr. 22, 2025

(54) DATABASE LOAD UNIT FOR REPLICATION LOG REPLAY

(71) Applicant: SAP SE, Walldorf (DE)

(72) Inventors: Janardhan Hungund, Pune (IN); Neha Shikha Kachhap, Ranchi (IN); Jagadeesha Kanihal, Bengaluru (IN); Sebastian Seifert, Heidelberg (DE); Bernhard Scheirle, Leimen (DE); Amit Pathak, Pune (IN); Werner Thesing, Lautertal (DE); Thomas Peh, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/529,218

(22) Filed: Dec. 5, 2023

(51) Int. Cl.
*G06F 16/27* (2019.01)
*G06F 16/25* (2019.01)

(52) U.S. Cl.
CPC ............ *G06F 16/27* (2019.01); *G06F 16/258* (2019.01)

(58) Field of Classification Search
CPC ................................ G06F 16/27; G06F 16/258
See application file for complete search history.

(56) References Cited

U.S. PATENT DOCUMENTS

2019/0325055 A1* 10/2019 Lee ...................... G06F 11/1448

* cited by examiner

*Primary Examiner* — Baoquoc N To
(74) *Attorney, Agent, or Firm* — Mintz Levin Cohn Ferris Glovsky and Popeo, P.C.

(57) ABSTRACT

A primary database system loads database objects into a primary in-memory store according to a given format. The primary database captures, in replay logs, the loading of the database objects according to the given format. The primary database sends the replay logs to a secondary database system. In response to receiving a replay log, the secondary database checks the value of a log replay configuration parameter. If the configuration parameter is a first value, the secondary database replays the replay log to load the corresponding database objects into a secondary in-memory store according to a first format. If the configuration parameter is a second value, the secondary database replays the log to load the objects according to a second format, and if the configuration parameter is a third value, the secondary database replays the log to load the objects in a same format which was used by the primary database.

18 Claims, 13 Drawing Sheets

DATABASE LOAD UNIT FOR REPLICATION LOG REPLAY

TECHNICAL FIELD

The present disclosure generally relates to database processing.

BACKGROUND

A database is an organized collection of data. A database typically organizes data to correspond to how the data is logically arranged. This facilitates operations on the data, for example, looking up values in a database, adding data to the database, sorting the data in the database, or summarizing relevant data in the database. A database management system ("DBMS") mediates interactions between a database, users and applications in order to organize, create, update, capture, analyze and otherwise manage the data in the database.

In order to efficiently handle queries, databases are typically configured to perform in-memory operations on data. In an in-memory database, data needed to execute and respond to a query is loaded into memory, and the query is executed against that in-memory data. However, many applications have large data stores, and loading all of the required data into memory for these applications may be difficult due to memory limitations. The amount of data being processed by database systems continues to increase faster than memory devices are evolving to store more data.

SUMMARY

In some implementations, a primary database system loads database objects into a primary in-memory store according to a given format determined at the primary database system. The primary database system captures, in replay logs, the loading of the database objects according to the given format. The primary database system sends the replay logs to a secondary database system. In response to receiving a replay log, the secondary database system checks the value of a log replay configuration parameter. If the log replay configuration parameter is a first value, the secondary database system replays the replay log to load the corresponding database objects into a secondary in-memory store according to a first format, which may or may not be different from the given format used by the primary database system. If the log replay configuration parameter is a second value, the secondary database system replays the first log to load the database objects into the secondary in-memory store according to a second format, which may or may not be different from the given format used by the primary database system. If the log replay configuration parameter is a third value, the secondary database system replays the first log to load the at least one database object into the secondary in-memory store in a same format (i.e., the given format) which was used by the primary database system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
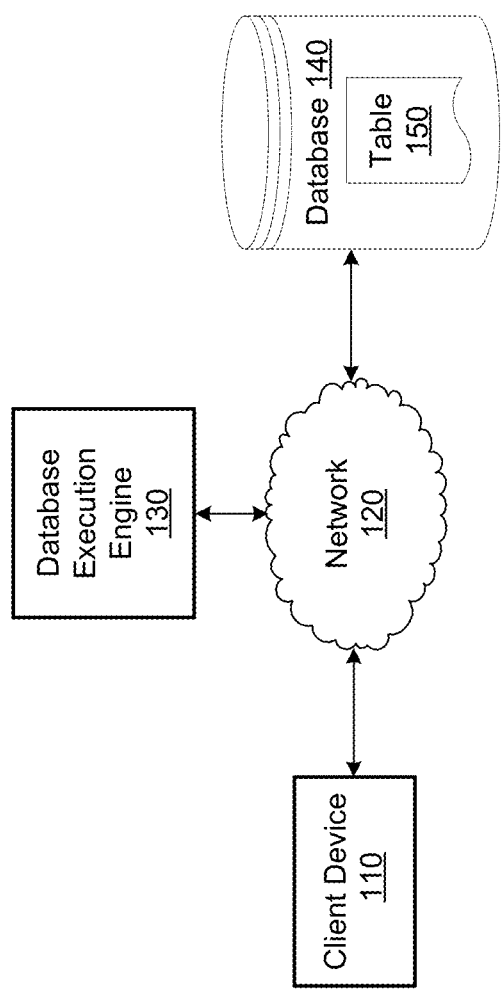
FIG. 1 illustrates an example of a database system, in accordance with some example implementations of the current subject matter.

Data structures are commonly created and populated in memory, and once populated, data structures may be persisted in persistence storage. Once in persistence storage, a data structure may be removed from memory when not needed. Then, if the data structure is again needed in memory at a future time, the data structure can be reconstructed from the information persisted in persistence storage. Loading a data structure refers to the reconstruction of the data structure in memory from the information persisted in the persistence storage. The representation of the data structure in the persistence store may not match the representation in memory, but the information stored in persistence storage is sufficient to allow for full reconstruction of the data structure in memory.

In a database, a database object is a data structure used to either store or reference data. A common type of database object is a table. Other types of database objects include columns, indexes, stored procedures, sequences, views, and others. The database may store each database object as a plurality of substructures that collectively forms and represents the database object. It is noted that the terms "substructure" and "subcomponent" may be used interchangeably herein. For a column, the substructures may include a dictionary, a data vector, and an index. The dictionary may associate each unique data value with a corresponding value identifier (ID). The value IDs may be numbered sequentially. The data vector may include value IDs that map to the actual values of the database object. The index may include a sequential listing of each unique value ID and one or more positions in the data vector containing the value ID.

When bringing database objects from persistence locations to in-memory locations, databases can bring the database objects into memory using multiple different formats. For example, one format is referred to as a column-loadable format. For the column-loadable format, the entire column is fully loaded into memory when the column is being queried. Fully loading the entire column into memory means bringing the entirety of the column's subcomponents (e.g., data, dictionary, and index) into memory. Another type of format that can be employed is referred to as a page-loadable format. For the page-loadable format, only the pages which contain parts of the column relevant to the query are loaded into memory. In other embodiments, other types of formats may be employed.

When loading data into memory, a load unit may be used to specify in which format to load the data and the granularity of data being loaded from the persistence store. In other words, the "load unit" defines the granularity of data being loaded into the in-memory store from the persistence store. A data description language (DDL) statement may change the load unit of various database objects such as a table, a partition or set of partitions of a table, a column or set of columns of a table, or a composite index defined on a table. In an example, the different types of load units that may be specified include page loadable, column loadable, and default loadable. For the default loadable format, database objects inherit their parent's load unit recursively.

While the format or load unit specifies how a column should be loaded into memory, the format does not necessarily determine how the column should be persisted. In some database deployments, the column-loadable format and page-loadable format load units may use different persistence based on their load unit definition. For example, a column-loadable column may be persisted by serializing the column's data, dictionary, and index in a single page chain. For page-loadable columns, these columns may be persisted using a paging scheme such that the page containing the required column portion for the query is easily identifiable and can be brought into memory for access. For a page-loadable column, a separate page chain is persisted for each of the column's data, dictionary, and index subcomponents.

In some embodiments, when bringing database objects from persistence store locations to in-memory locations, a database may determine whether to load database objects in a column-loadable format or in a page-loadable format depending on the current workload, a corresponding attribute, and/or one or more other operating conditions. In some cases, storing the database objects in the column-loadable format is preferable, while in other cases, it is preferred to store the database objects in the page-loadable format. The mechanisms and data layout for storing database objects in column-loadable format differ from the configuration for storing database objects in the page-loadable format. Therefore, switching between the two configurations may require a full rewrite of the data persistence. The rewrite results in the consumption of considerable memory and processing resources. Accordingly, switching between in-memory formats may be expensive in terms of memory and processing resources utilized due to the necessary rewrites. Therefore, improved techniques are desired that do not require persistence store rewrites for converted load units.

In an example, if the given database object has a column-loadable load unit, and the processing logic decides not to convert the load unit, then the given database object is loaded into the in-memory store in the column-loadable format. When loading a column into the in-memory store in the column-loadable format, the processing logic loads the entire column into the in-memory store. If the given database object has a page-loadable load unit, and the processing logic decides not to convert the load unit, then the given database object is loaded into the in-memory store in the page-loadable format. For the page-loadable format, the processing logic loads only the relevant pages into the in-memory store.

In an example, less frequently used tables are brought into memory in a page-loadable format, even those tables having a column-loadable load unit. For these less frequently used tables, only the relevant pages are brought into memory for the query being executed. In some embodiments, more frequently used tables are brought into memory in column-loadable format, even those tables having a page-loadable load unit. For these more frequently used tables, the entire column is brought into memory. In some embodiments, when storing to the persistence store from the in-memory store, the processing logic stores database objects into a single "unified persistence format" regardless of their in-memory format.

The unified persistence format allows each database object to be loaded into memory in column-loadable format or page-loadable format from the same persistence. The unified persistence format also allows for a load unit conversion for a given database object without requiring a rewrite of the given database object in the persistence store.

The unified persistence format includes a separate composite page chain for the data, dictionary, and index subcomponents of the given database object. A composite page chain may have one or more sub-page chains.

Another type of persistence format is a serial persistence format which involves storing subcomponents together in a sequential manner such as in a single page chain. The serial persistence format may be suitable for scenarios where data components are relatively small and can be efficiently stored together in a single chain. The serial persistence format is often used for smaller datasets and offers advantages such as compact storage and faster access of the dataset. On the other hand, the unified persistence format is more suitable for larger and more complex datasets, where subcomponents may vary significantly in size. The unified persistence format allows each subcomponent to be stored optimally and independently from each other, taking into consideration each subcomponent's specific size and characteristics. The unified persistence offers advantages such as improved performances, and the ability to load the persisted data in either a column-loadable or page-loadable format, which is not available if the dataset was saved in the serial persistence format.

Modern database systems may provide data replication services to mirror data and improve performance. Data replication involves copying data from a database (i.e., the primary database) on one server to another database (i.e., the secondary database) on a different server or client. In some implementations, the secondary database is configured to be an exact duplicate in terms of processing resources, memory capacity, storage capacity, and so on. However, while this configuration simplifies the management of the primary and secondary databases, this can be an expensive configuration to maintain.

Accordingly, some organizations may implement a secondary database that is a scaled down version of the primary database in order to reduce costs, by way of non-limiting example. In these cases, the replication of data and the switching over from the primary to secondary database during failure or downtime becomes more complicated. For example, if the secondary database has half the memory capacity as the primary database, the load units used by the primary database for loading database objects may be suboptimal if applied at the secondary database. To illustrate further, if the primary database uses the column-loadable format for all or most database objects loaded into the in-memory store, these database objects will be fully loaded into the in-memory store. This approach may not be feasible at the secondary database due to the smaller capacity of its in-memory store. Therefore, to account for the differences in the physical configuration of the primary database as compared to the secondary database, the secondary database may use different load units for the same database objects loaded by the primary database. In an example, the secondary database may use the page-loadable format for database objects that are loaded in the column-loadable format at the primary database. As mentioned above, the page-loadable format involves loading only those pages relevant to a query into the in-memory store, reducing the memory utilization.

Referring now to FIG. 1, a system diagram illustrating an example of a database system 100 is depicted, in accordance with some example embodiments. In FIG. 1, the database system 100 may include one or more client devices 110, a database execution engine 130, and one or more databases 140. It is noted that the terms "database execution engine", "processor", and "processing logic" may be used interchangeably herein. Database 140 is shown as including table 150, which is representative of any number and type of database objects stored by database 140.

The one or more client devices 110, the database execution engine 130, and the one or more databases 140 may be communicative coupled via a network 120. The one or more databases 140 may include a variety of relational databases including, for example, an in-memory database, a column-based database, a row-based database, and/or the like. The one or more client devices 110 may include processor-based devices including, for example, a mobile device, a wearable apparatus, a personal computer, a workstation, an Internet-of-Things (IoT) appliance, and/or the like. The network 120 may be a wired network and/or wireless network including, for example, a public land mobile network (PLMN), a local area network (LAN), a virtual local area network (VLAN), a wide area network (WAN), the Internet, and/or the like.

Figure 2:
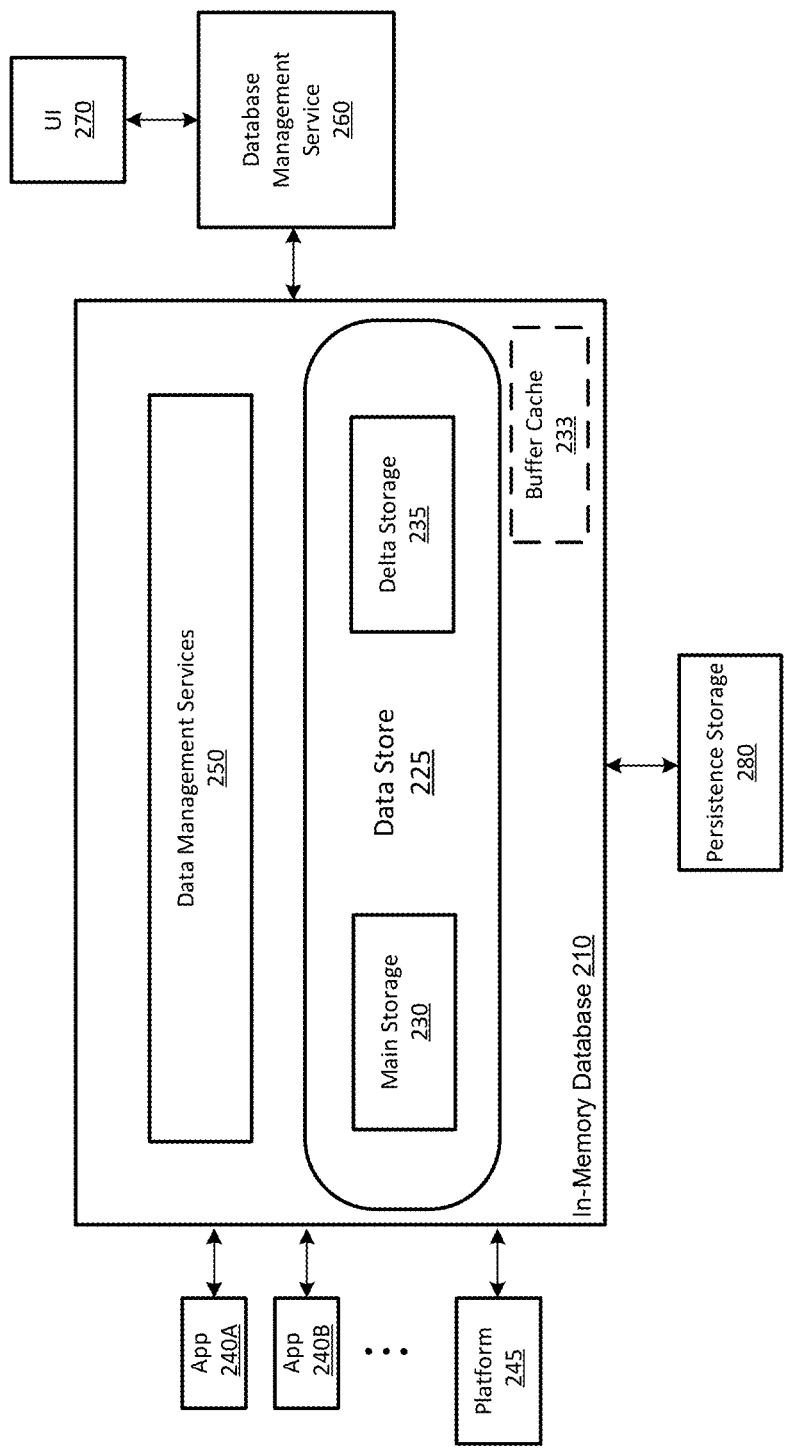
FIG. 2 illustrates another example of a system, in accordance with some example implementations of the current subject matter.

Turning now to FIG. 2, a diagram is depicted illustrating an example of a system 200 consistent with implementations of the current subject matter. System 200 includes applications 240A-B which interact with in-memory database 210. Applications 240A-B are representative of any number and type of applications executing within system 200. For example, applications 240A-N can include analytical services, transaction processing service, reporting services, dashboard services, and the like. Applications 240A-N interact with in-memory database 210 using structure queries or other expressions. System 200 also includes one or more platforms 245. In some embodiments, a given platform 245 can be a data warehousing service that exposes online analysis processing (OLAP) services to a user or application. The database management service 260 provides administration services and access to settings of the in-memory database 210. The user interface (UI) 270 mediates interactions between the database management service 260 and a user or application, for example, to configure the in-memory database 210 or set user preferences for sort operations.

Within the in-memory database 210, the data management services 250 manage transactions with the main storage 230 and the delta storage 235. The data management services 250 can provide a calculation and planning engine, modeling services, real-time replication services, data integration services, and/or other services. The main storage 230 supports fast read access to data of the in-memory database 210 in data store 225. A read operation accesses both the main storage 230 and delta storage 235, which includes any recently changed data that has not yet been incorporated into the main storage 230. The data in the main storage 230 may be backed up to persistence storage 280. Persistence storage 280 may be disk storage or other suitable type of memory device. The change data in the delta storage 235 is also backed up to persistence storage 280, so that changes survive events such as database failures, downtimes, and so on. Buffer cache 233 refers to a portion of memory providing temporary storage for data loaded from persistence storage 280. If for example a query or database operation requires a portion of a column or a database table, the corresponding pages required to respond to the query may be identified and then loaded into buffer cache 233.

In some embodiments, the persistence storage 280 stores database objects in a single unified persistence format regardless of the load unit of the objects. The unified persistence format will be described in more detail throughout the remainder of this disclosure. It should be understood that the example architecture of system 200 is merely indicative of what may be employed in some embodiments.

In other embodiments, system 200 may be structured in other suitable manners with other arrangements of components.

Figure 3:
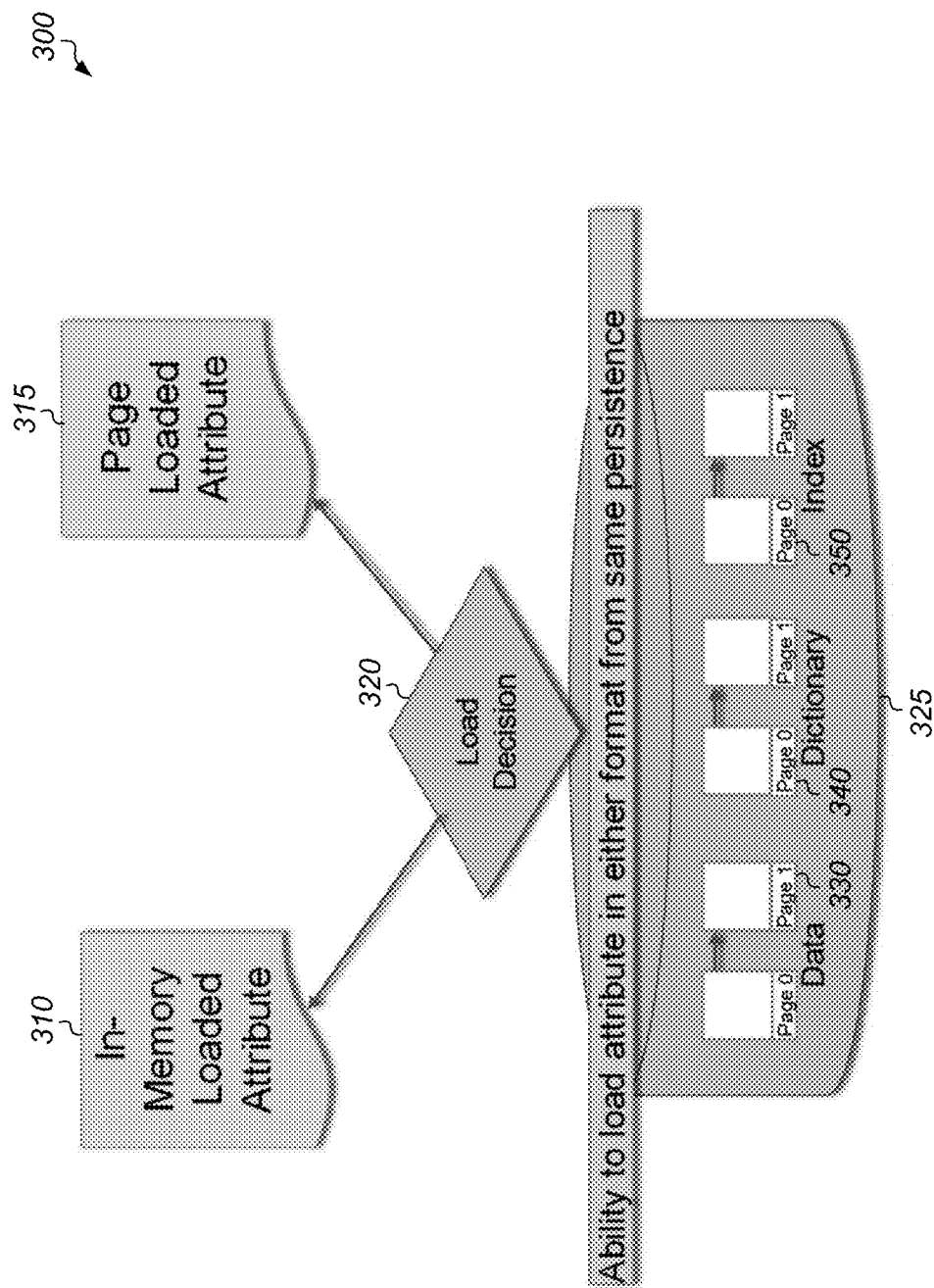
FIG. 3 illustrates an example of a system for implementing a load unit decision, in accordance with some example implementations of the current subject matter.

Referring now to FIG. 3, a block diagram of an example of a system 300 for implementing a load unit decision is shown. When a table is persisted into persistence store 325 using the unified persistence format, each column of the table has separate page chains for the data, dictionary, and index subcomponents. These are shown as the data page chain 330, dictionary page chain 340, and index page chain 350. When loading a portion of a table into memory from persistence store 325, a load unit decision 320 is made dynamically regarding the intended structure of the table in the in-memory store. If the load unit decision 320 is to use page loaded attribute 315 (i.e., a page-loadable load unit), then the table will be loaded into memory using a page-loadable format. The page-loadable format has a separate page chain for the data, dictionary, and index parts of the table. By having separate page chains for the data, dictionary, and index parts of the table, just the relevant pages can be loaded into memory rather than the entire column. If the load unit decision is to use in-memory loaded attribute 310, then the table will be loaded into memory using the column-loadable load unit, also referred to as an in-memory loaded format or a column-loadable format.

When the column of the table is loaded into memory using the column-loadable format, then the entirety of the data is read from persistence store 325, and the index vector, dictionary, and inverted index vector are created as in-memory structures. Once the data has been read from the persistence store 325 and the in-memory structures have been created, then the corresponding pages from the persistence store 325 are not accessed anymore. Using the in-memory index vector, a particular offset can be directly accessed in the in-memory store.

When the column of the table is loaded into memory using the page-loadable format, then only the relevant data is read from persistence store 325 and loaded into memory. In an example, in the page-loadable format, the processor first calculates in which page the offset lies, then that page is loaded, and then data is read from that page. Within that page, additional calculations may be needed from the header to get to the specific offset of a particular row.

Figure 4:
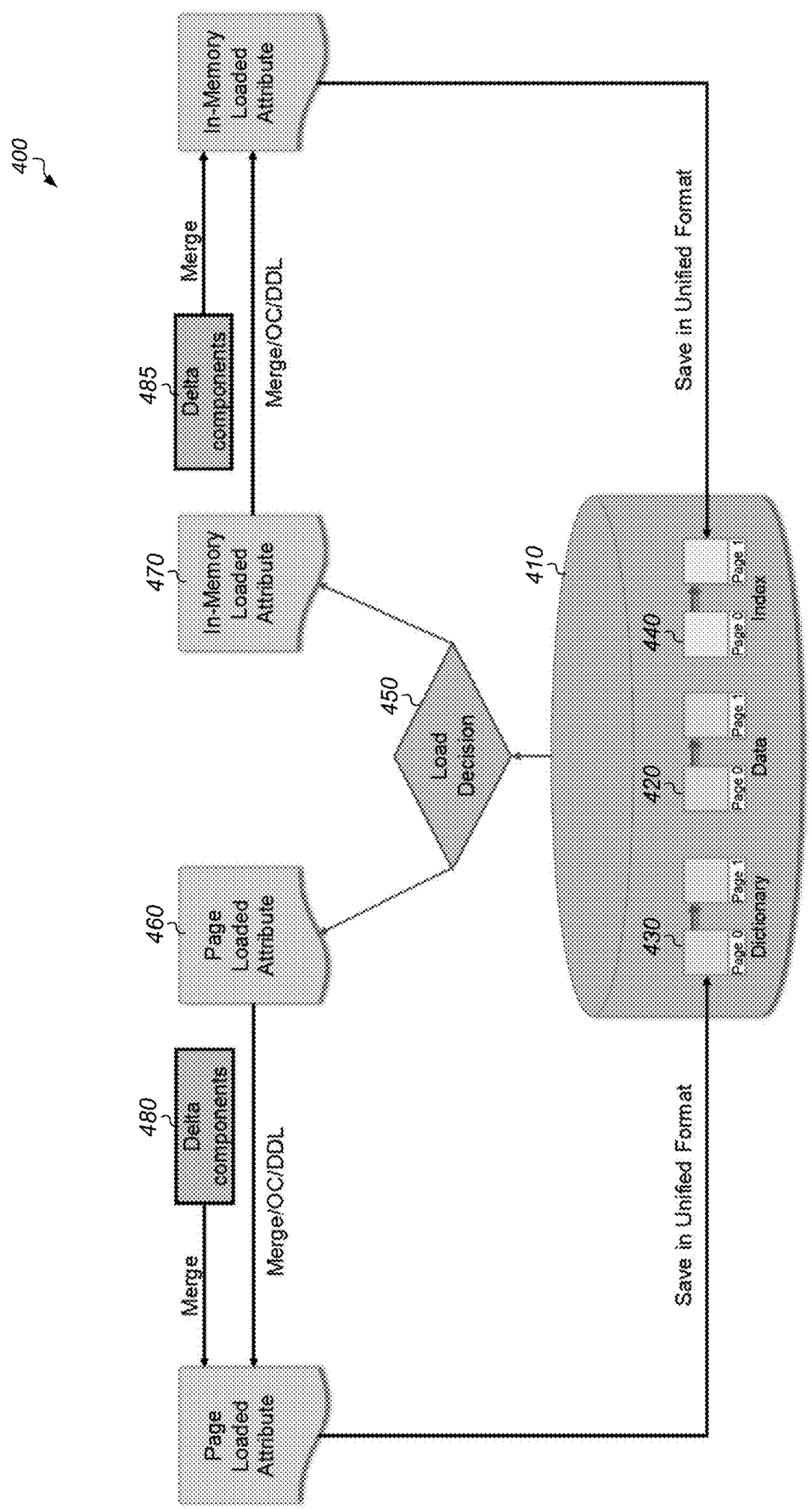
FIG. 4 illustrates another example of system for implementing a load unit decision, in accordance with some example implementations of the current subject matter.

Turning now to FIG. 4, another example of a system 400 for implementing a load unit decision is shown. As shown, system 400 includes persistence store 410 which stores data in a unified persistence format. For tables stored in the unified persistence format, each component of each column (i.e., attribute) of the table has a separate page chain. For example, the data component is stored as data page chain 420, the dictionary component is stored as dictionary page chain 430, and the index component is stored as index page chain 440.

When a given portion of the table needs to be loaded into the in-memory store from persistence store 410, a load decision 450 will be made to determine in what format the given portion will be stored in memory. In an example, the determination of which format to load the given portion in-memory is based at least on an attribute associated with the table portion. For example, the attribute may be a page-loaded attribute 460 or the attribute may be an in-memory loaded attribute 470. In another example, the determination of which format to load the given portion in-memory is also based on real-time operating conditions (e.g., memory utilization, how frequently the table is accessed). If the real-time operation conditions indicate that a load unit conversion should not be performed, based on memory utilization, frequency of access, and other factors, then the load decision 450 can default back to the attribute associated with the table. For queries referencing a column with a page-loaded attribute 460, if a load unit conversion is not implemented, then the data is loaded into memory in the page-loadable format. For queries referencing a column with an in-memory loaded attribute 470, if a load unit conversion is not implemented, then the data is loaded into memory in the column-loadable format.

If a load unit conversion is implemented, then a column with a page-loaded attribute 460 is loaded in column-loadable format into the in-memory store. Or, if the column has an in-memory loaded attribute 470 and a load unit conversion is implemented, then the column is loaded in page-loadable format into the in-memory store. In an example, the load unit conversion may be implemented if memory utilization is below a threshold by converting a page-loadable load unit into a column-loadable load unit. Alternatively, or additionally, the load unit conversion may be implemented if memory utilization is above a threshold by converting a column-loadable load unit into a page-loadable load unit. Alternatively, or additionally, the load unit conversion may be implemented if the access frequency of the column is above a threshold by converting a page-loadable load unit into a column-loadable load unit. Alternatively, or additionally, the load unit conversion may be implemented if the access frequency of the column is below a threshold by converting a column-loadable load unit into a page-loadable load unit. Other conditions for performing a load unit conversion are possible and are contemplated.

Once a table is loaded into the in-memory store, when changes are made to the table in the page-loadable format, the delta components 480 are merged with the unchanged data and saved back into persistence store 410 in the unified persistence format. Similarly, when changes are made to a table in the column-loadable format in the in-memory store, the delta components 485 are merged with the unchanged data and saved back into persistence store 410 in the unified persistence format. In other words, in this example, regardless of which load unit is used for loading a table into memory, the changed data will be merged back and stored in the unified persistence format in persistence store 410.

Figure 5:
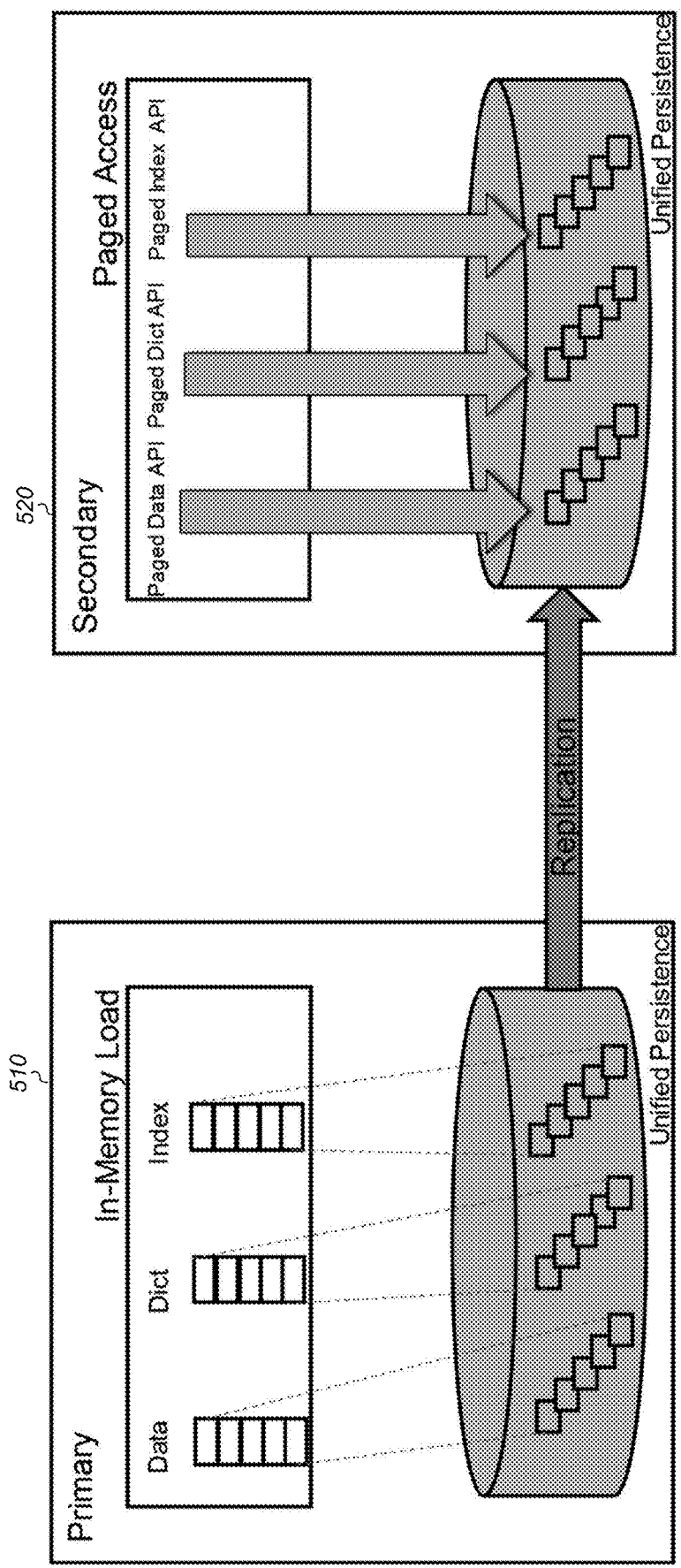
FIG. 5 illustrates an example of a system with a primary database and a secondary database, in accordance with some example implementations of the current subject matter.

Referring now to FIG. 5, a system 500 with a primary database 510 and a secondary database 520 is shown. As shown, data is being replicated from primary database 510 to secondary database 520. Also, redo logs may be sent from primary database 510 to secondary database 520. The redo logs contain the modifications that are performed on primary database 510, and the redo logs are sent to secondary database 520 so that the same modifications may be applied to secondary database 520. Secondary database 520 is prepared to be used in the event there is a failure in primary database 510. In the event of a failure in primary database 510, system 500 may switch to secondary database 520 to be used in place of primary database 510, and the columns may be used on secondary database 520 in the paged format prior to the columns being fully loaded into memory.

On primary database 510, the columns are loaded according to the in-memory format, with the whole column loaded into memory. This is indicated by having the entirety of the data, dictionary, and index subcomponents of the columns loaded into the in-memory store. Since unified persistence format allows different load units to be used, secondary database 520 loads the column into memory in the page-loadable format using paged structures. On secondary database 520, the load unit may be decided on a column-by-column basis. In an example, for secondary database 520, when a given column is not fully loaded into memory, the given column points to the corresponding page chains in the persistence store. During an access, the relevant data is loaded page-by-page into memory. For example, when a query is executed, only parts of the data that are needed for the query are loaded into memory from the persistence store.

In some embodiments, system 500 may include various types of configuration parameters. In an example, a first configuration parameter is referred to as a "load unit on log replay parameter" or as a "log replay configuration parameter", which may be one of three values: default, page loadable, or column loadable. When the log replay configuration parameter is set to default, then the table on the secondary database 520 will match the format of the table on the primary database 510. When the log replay configuration parameter is set to page loadable, then even if a particular table is loaded in the column loadable format on the primary database 510, the particular table will be page loadable on the secondary database 520. Similarly, when the log replay configuration parameter is set to column loadable, then even if a given table is loaded in the page loadable format on the primary database 510, the given table will be column loadable on the secondary database 520.

In an example, another configuration parameter is referred to as a load unit after failover parameter, which may have one of two values: continue as log replay, and reset to primary with reload. When the load unit after failover parameter is set to continue as log replay, then the load unit continues with the same load format on the secondary database 520 which was used on the primary database 510. When the load unit after failover parameter is set to reset to primary with reload, then on the secondary database 520, the load unit is switched to be the same as the primary database 510. This will result in explicit execution of a procedure for an unload or reload script to identify the loaded columns and then unload and reload them back in the defined load unit. In an example, this script will be integrated with a failover script. In another example, this script will be enabled when the load unit after failover configuration parameter is set.

Figure 6:
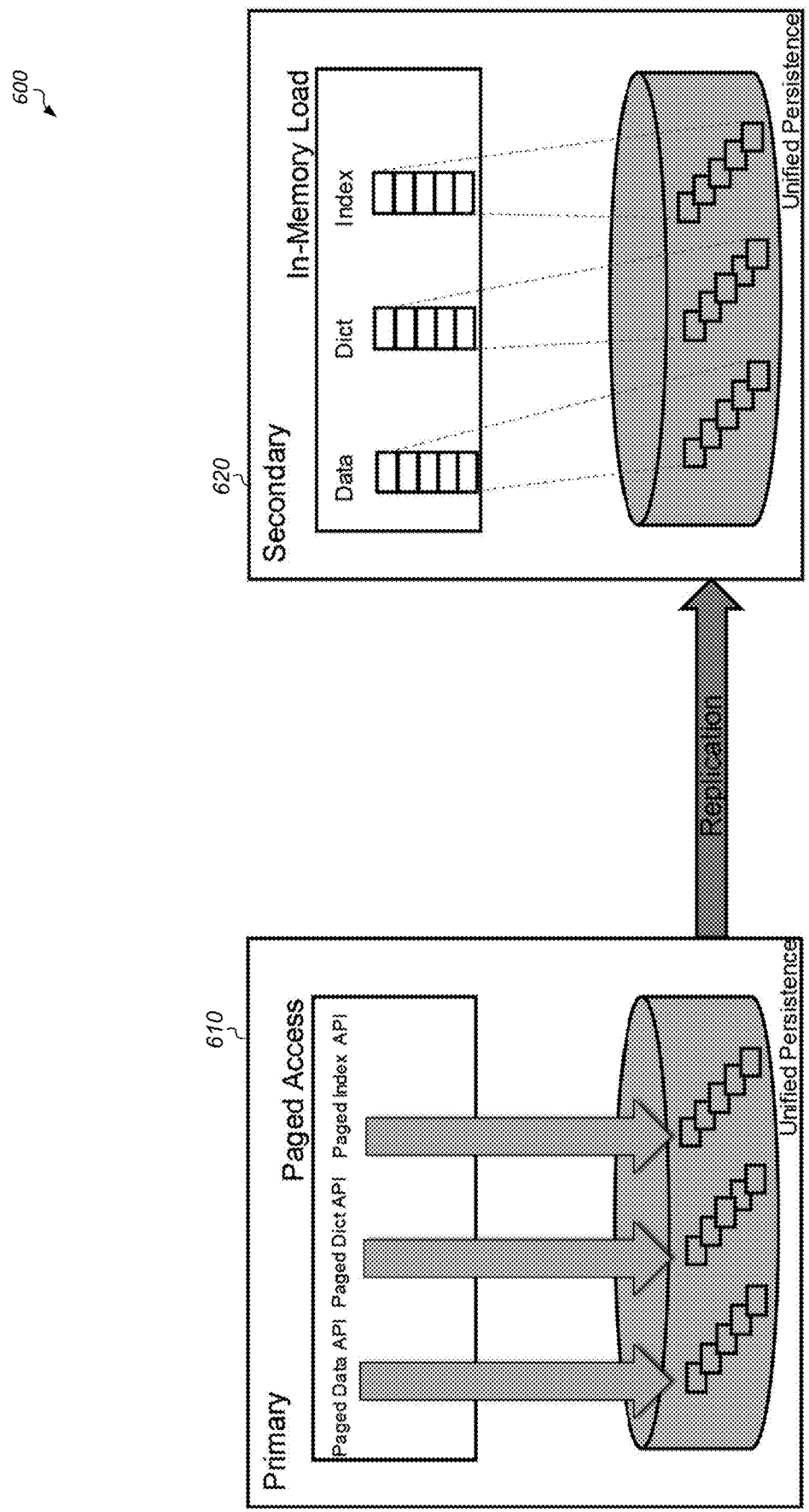
FIG. 6 illustrates another example of a system with a primary database and a secondary database, in accordance with some example implementations of the current subject matter.

Turning now to FIG. 6, another example of a system 600 with a primary database 610 and a secondary database 620 is shown. System 600 has a reversed configuration as compared to system 500, in that primary database 610 loads columns into memory in a page-loadable format while secondary database 620 loads columns into memory in column-loadable format. This is the flexibility that the unified persistence format enables, allowing primary database 610 and secondary database 620 to load data in either page-loadable or column-loadable format from the same persistence, without having to rewrite the persistence.

In an example, the configuration of system 600 may be employed right after a failure of primary database 610 when secondary database 620 has taken over as the new primary database. In this example, recovery operations will be performed on primary database 610 to setup the primary database 610 as the new secondary database. The recovery operations may include executing the previously replicated redo logs, by way of non-limiting example.

Figure 7:
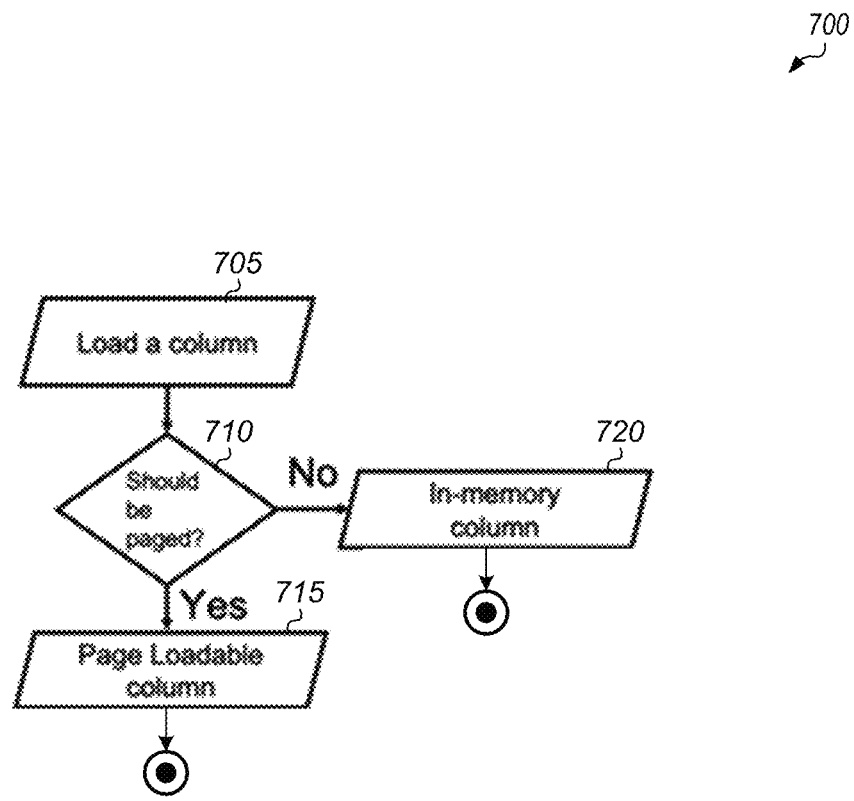
FIG. 7 illustrates an example of a process for dynamically determining load units for bringing database objects and/or database objects subcomponents into memory, in accordance with some example implementations of the current subject matter.

Referring now to FIG. 7, a process is depicted for dynamically determining load units for bringing database objects and/or database object subcomponents into memory. At the beginning of method 700, an operation to initiate loading of a column into memory is detected (block 705). For example, when a query targeting the column is received, this may initiate the loading of the column into memory. Next, the database determines if the column should be paged (conditional block 710). If the column should be paged (conditional block 710, "yes" leg), then the paged data structures are created and the relevant pages of the column are loaded into memory (block 715). If the column should not be paged (conditional block 710, "no" leg), then the entire column is loaded into memory and the paged data structures are not created (block 720). After blocks 715 and 720, method 700 may end.

Figure 8:
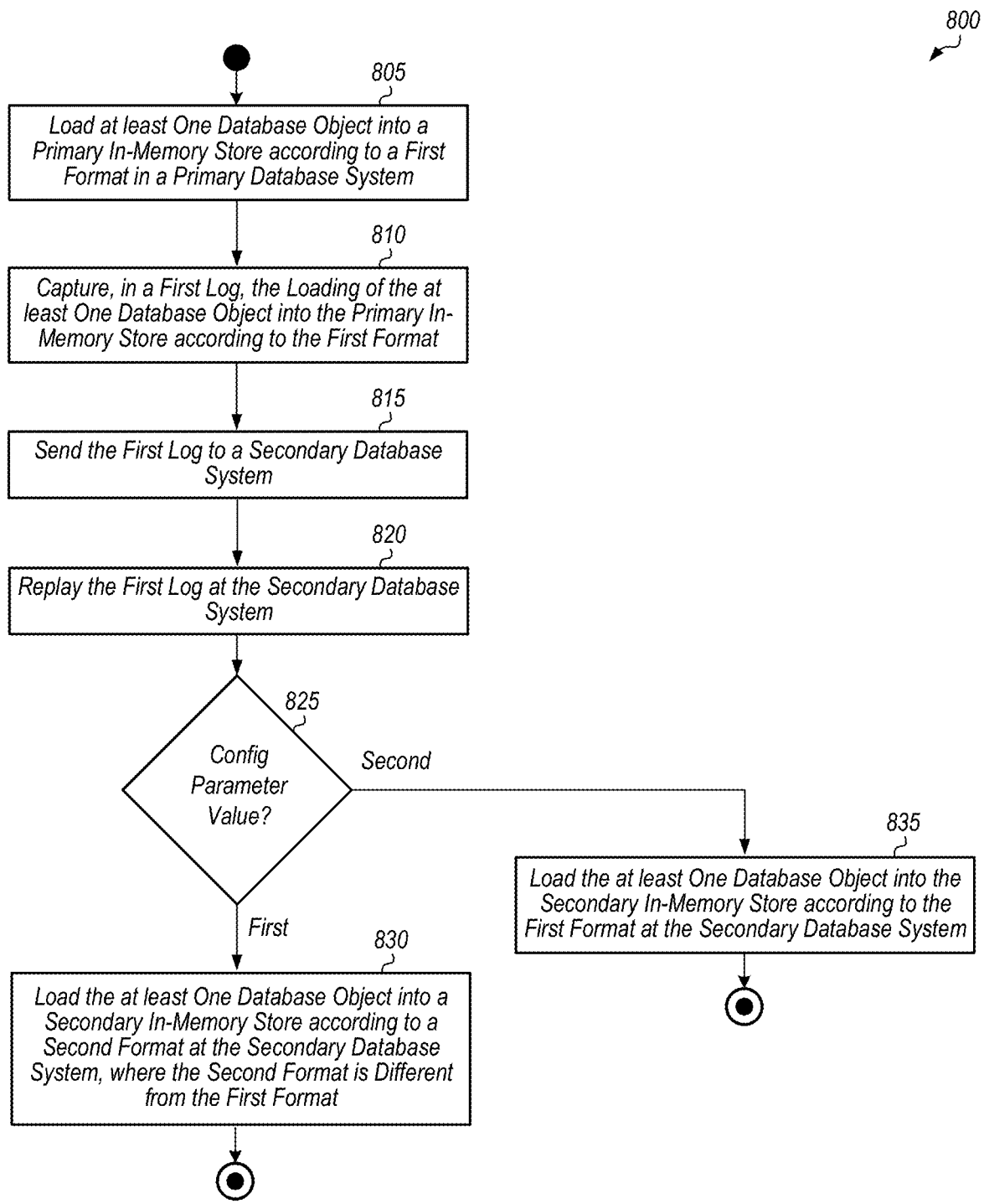
FIG. 8 illustrates an example of a process for using different load units when loading database objects into memory at primary and secondary database systems, in accordance with some example implementations of the current subject matter.

Turning now to FIG. 8, a process is depicted for using different load units when loading database objects into memory at primary and secondary database systems. At the beginning of method 800, at least one database object is loaded into a primary in-memory store according to a first format in a primary database system (block 805). In an example, the first format is a column-loadable format. The term "primary in-memory store" refers to the in-memory store at the primary database system. The primary database system refers to the main or active database system which is actively being used by one or more users, an organization, or other entity. In an example, the primary database system is replicating data to a secondary or non-active database system, with the secondary database system being intended to takeover for the primary database system in the case of a failure or other event or circumstances.

Next, the loading of the at least one database object into the primary in-memory store according to the first format is captured in a first log (block 810). Then, the first log is sent to a secondary database system (block 815). In response to receiving the first log, the secondary database system replays the first log (block 820). When replaying the first log, the secondary database system checks a value of a log replay configuration parameter (conditional block 825). If the log replay configuration parameter is a first value (conditional block 825, "first" leg), then the secondary database system loads the at least one database object into a secondary in-memory store according to a second format, where the second format is different from the first format (block 830). The term "secondary in-memory store" refers to the in-memory store at the secondary database system. After block 830, method 800 may end. In an example, the second format is a page-loadable format. Otherwise, if the log replay configuration parameter is a second value (conditional block 825, "second" leg), then the secondary database system loads the at least one database object into the secondary in-memory store according to the first format (block 835). After block 835, method 800 may end.

Figure 9:
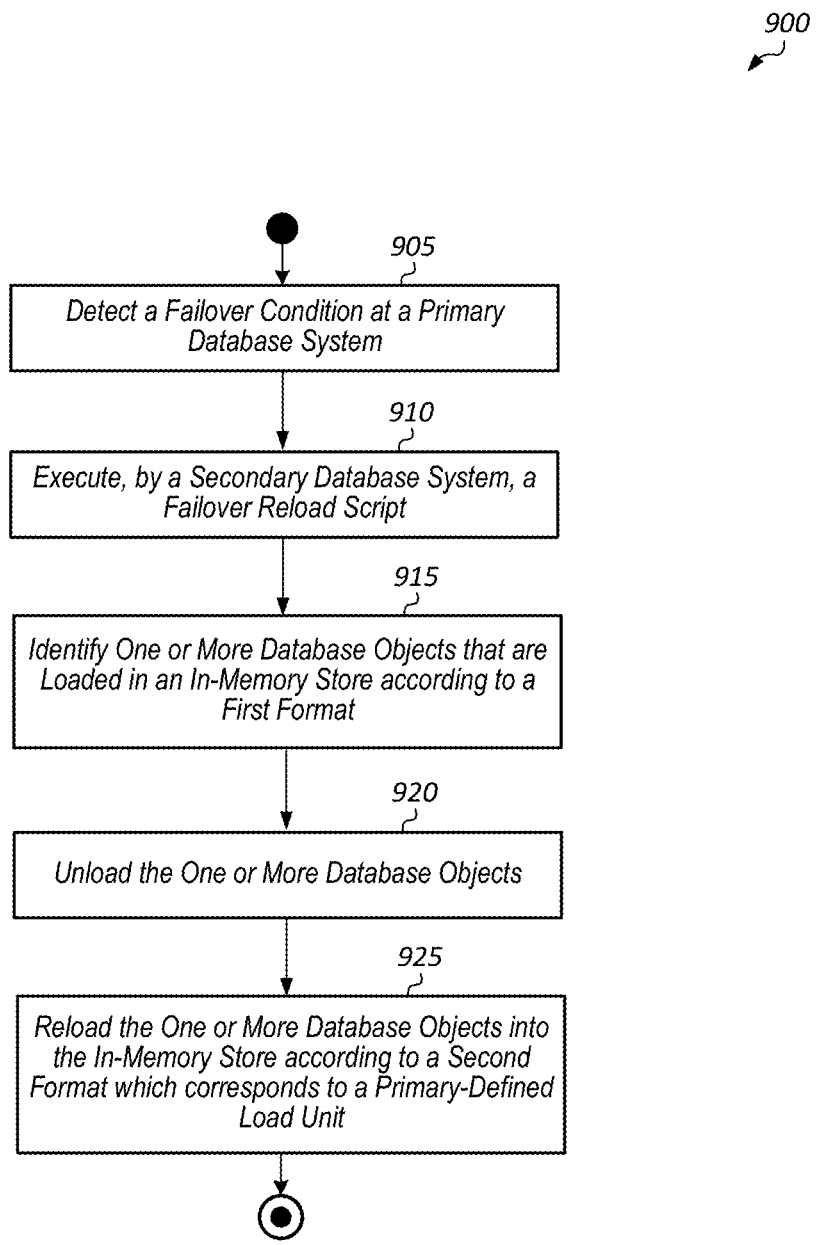
FIG. 9 illustrates an example of a process for executing a failover reload script at a secondary database system, in accordance with some example implementations of the current subject matter.

Referring now to FIG. 9, a process is depicted for executing a failover reload script at a secondary database system. At the beginning of method 900, a failover condition at a primary database system is detected (block 905). In response to detecting the failover condition, a secondary database system executes a failover reload script (block 910). In an example, the failover reload script may be integrated within an overall failover script that is executed by the secondary database system. In this example, the failover reload script is executed only when a reset-to-primary configuration parameter is set.

As part of executing the failover reload script, the secondary database system identifies one or more database objects that are loaded in an in-memory store according to a first format (block 915). In an example, the first format is a page-loadable format. Next, the secondary database system unloads the one or more database objects (block 920). Then, the secondary database system reloads one or more database objects into the in-memory store according to a second format which corresponds to a primary-defined load unit (block 925). In an example, the second format is a column-loadable format. After block 925, method 900 ends.

Figure 10A:
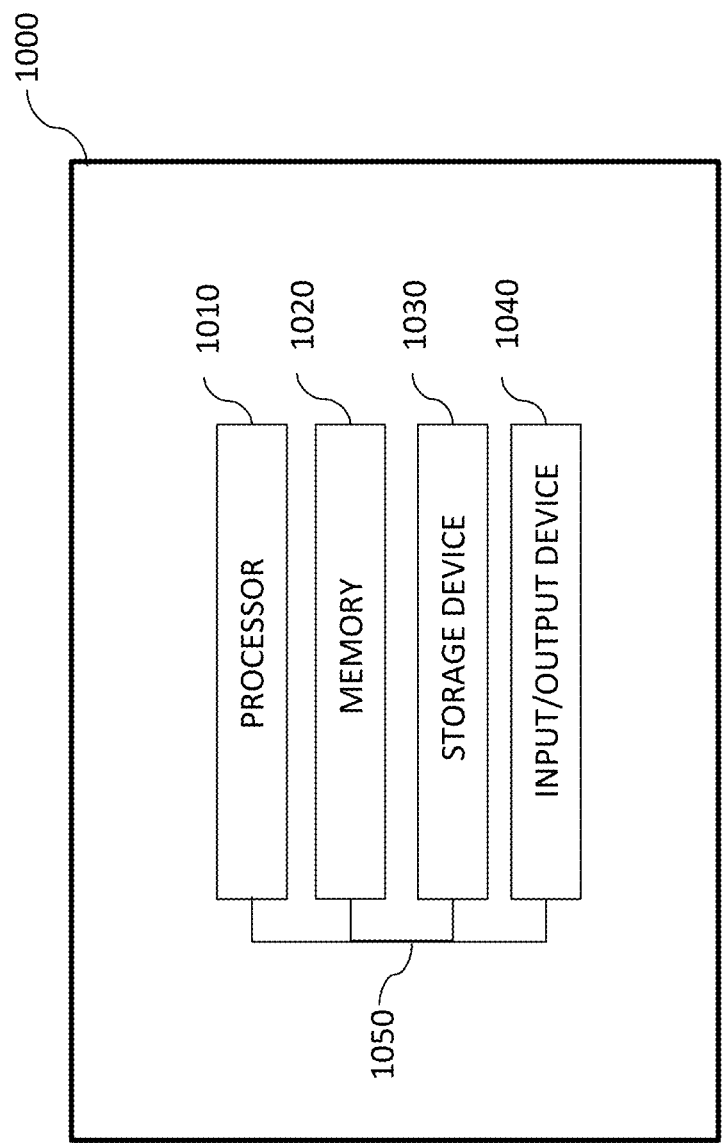
FIG. 10A depicts an example of a system, in accordance with some example implementations of the current subject matter.

In some implementations, the current subject matter may be configured to be implemented in a system 1000, as shown in FIG. 10A. The system 1000 may include a processor 1010, a memory 1020, a storage device 1030, and an input/output device 1040. Each of the components (e.g., 1010, 1020, 1030 and 1040) may be interconnected using a system bus 1050. The processor 1010 may be configured to process instructions for execution within the system 1000. In some implementations, the processor 1010 may be a single-threaded processor. In alternate implementations, the processor 1010 may be a multi-threaded processor. The processor 1010 may be further configured to process instructions stored in the memory 1020 or on the storage device 1030, including receiving or sending information through the input/output device 1040. The memory 1020 may store information within the system 1000. In some implementations, the memory 1020 may be a computer-readable medium. In alternate implementations, the memory 1020 may be a volatile memory unit. In yet some implementations, the memory 1020 may be a non-volatile memory unit. The storage device 1030 may be capable of providing mass storage for the system 1000. In some implementations, the storage device 1030 may be a computer-readable medium. In alternate implementations, the storage device 1030 may be a floppy disk device, a hard disk device, an optical disk device, a tape device, non-volatile solid state memory, or any other type of storage device. The input/output device 1040 may be configured to provide input/output operations for the system 1000. In some implementations, the input/output device 1040 may include a keyboard and/or pointing device. In alternate implementations, the input/output device 1040 may include a display unit for displaying graphical user interfaces.

Figure 10B:
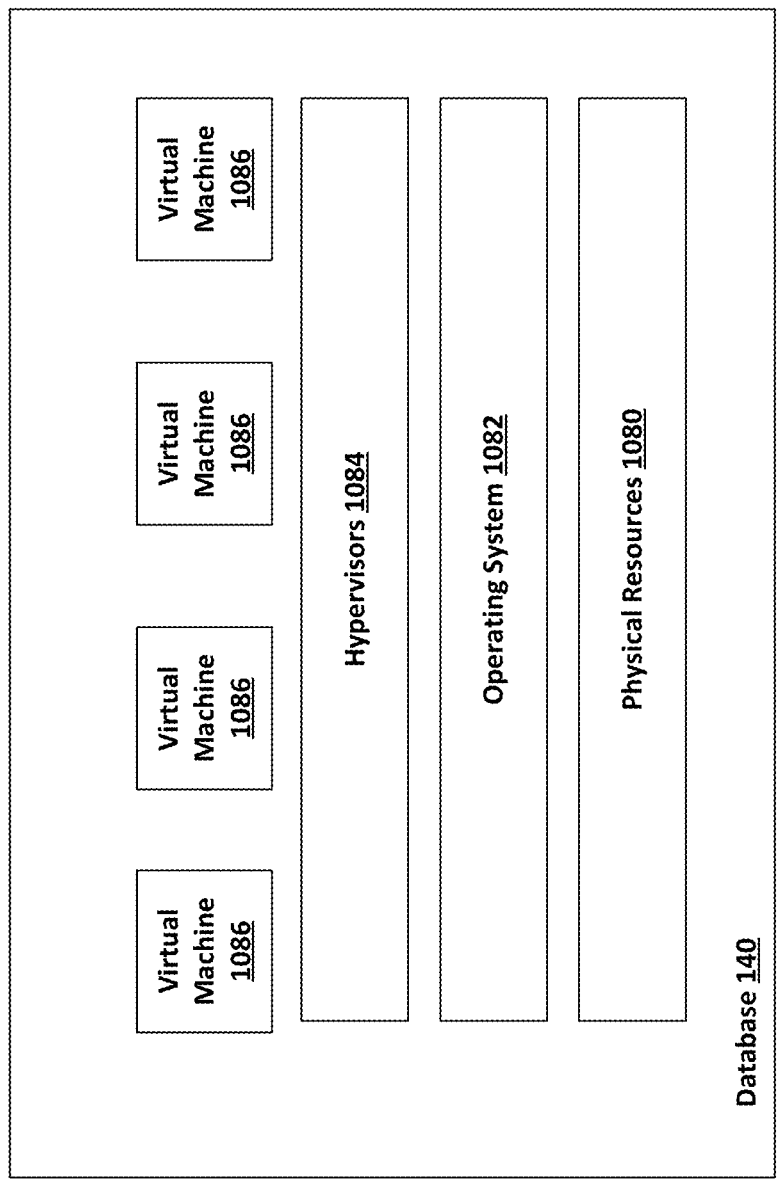
FIG. 10B depicts another example of a system, in accordance with some example implementations of the current subject matter.

FIG. 10B depicts an example implementation of the database 140, which provides database services. The database 140 may include physical resources 1080, such as at least one hardware servers, at least one storage, at least one memory, at least one network interface, and the like. The database 140 may also include infrastructure, as noted above, which may include at least one operating systems 1082 for the physical resources and at least one hypervisor 1084 (which may create and run at least one virtual machine 1086). For example, each multitenant application may be run on a corresponding virtual machine.

Figure 11:
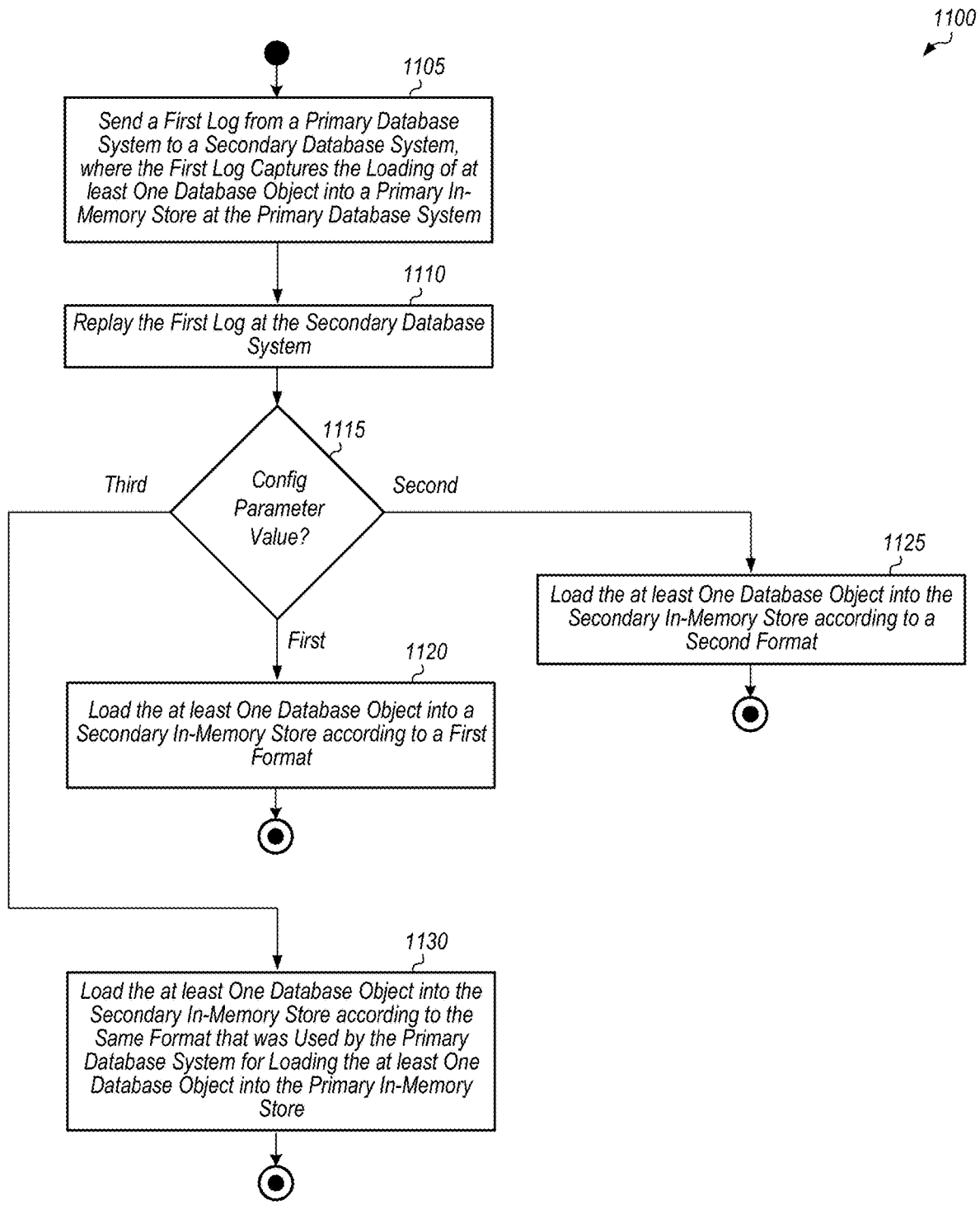
FIG. 11 illustrates an example of a process for determining a load unit when loading database objects into memory at a secondary database system, in accordance with some example implementations of the current subject matter.

Referring now to FIG. 11, a process is depicted for determining a load unit when loading database objects into memory at a secondary database system. At the beginning of method 1100, a first log is sent from a primary database system to a secondary database system, where the first log captures the loading of at least one database object into a primary in-memory store at the primary database system (block 1105). In response to receiving the first log, the secondary database system replays the first log (block 1110). When replaying the first log, the secondary database system checks a value of a log replay configuration parameter (conditional block 1115). If the log replay configuration parameter is a first value (conditional block 1115, "first" leg), then the secondary database system loads the at least one database object into a secondary in-memory store according to a first format (block 1120). In an example, the first format is a page-loadable format, and the log replay configuration parameter being set to the first value specifies or indicates that database objects should be loaded in the page-loadable format. In this case, the secondary database system can override the load unit decision that was made at the primary database system for loading the at least one database object into the primary in-memory store. After block 1120, method 1100 may end.

If the log replay configuration parameter is a second value (conditional block 1115, "second" leg), then the secondary database system loads the at least one database object into the secondary in-memory store according to a second format (block 1125). It should be understood that the second value is different from the first value, and the second value can be indicated, specified, or encoded in any suitable manner to indicate that it is distinct from the first value. In an example, the second format is a column-loadable format, and the log replay configuration parameter being set to the second value specifies or indicates that database objects should be loaded in the column-loadable format. Similarly, in this case, the secondary database system can also override whatever load unit decision was made at the primary database system for loading the at least one database object into the primary in-memory store. In other words, regardless of the load unit decision that was made at the primary database system for loading the at least one database object into the primary in-memory store, since the log replay configuration parameter has the second value, secondary database system will load the at least one database object into the secondary in-memory store according to the second format. After block 1125, method 1100 may end.

If the log replay configuration parameter is a third value (conditional block 1115, "third" leg), then the secondary database system loads the at least one database object into the secondary in-memory store according to the same format that was used by the primary database system for loading the at least one database object into the primary in-memory store (block 1130). In an example, in block 1130, if the at least one database object was loaded in the page-loadable format in the primary in-memory store, then the secondary database system will load the at least one database object in the page-loadable format in the secondary in-memory store. In this example, in block 1130, if the at least one database object was loaded in the column-loadable format in the primary in-memory store, then the secondary database system will load the at least one database object in the column-loadable format in the secondary in-memory store. It should be understood that the third value is different from the first and second values. In some cases, the third value may be referred to as a default value or "default", where the secondary database system defaults to the same load unit as the primary database system. In other words, the secondary uses a load unit format that matches what was used on the primary when the log replay configuration parameter is set to default. After block 1130, method 1100 may end.

Figure 12:
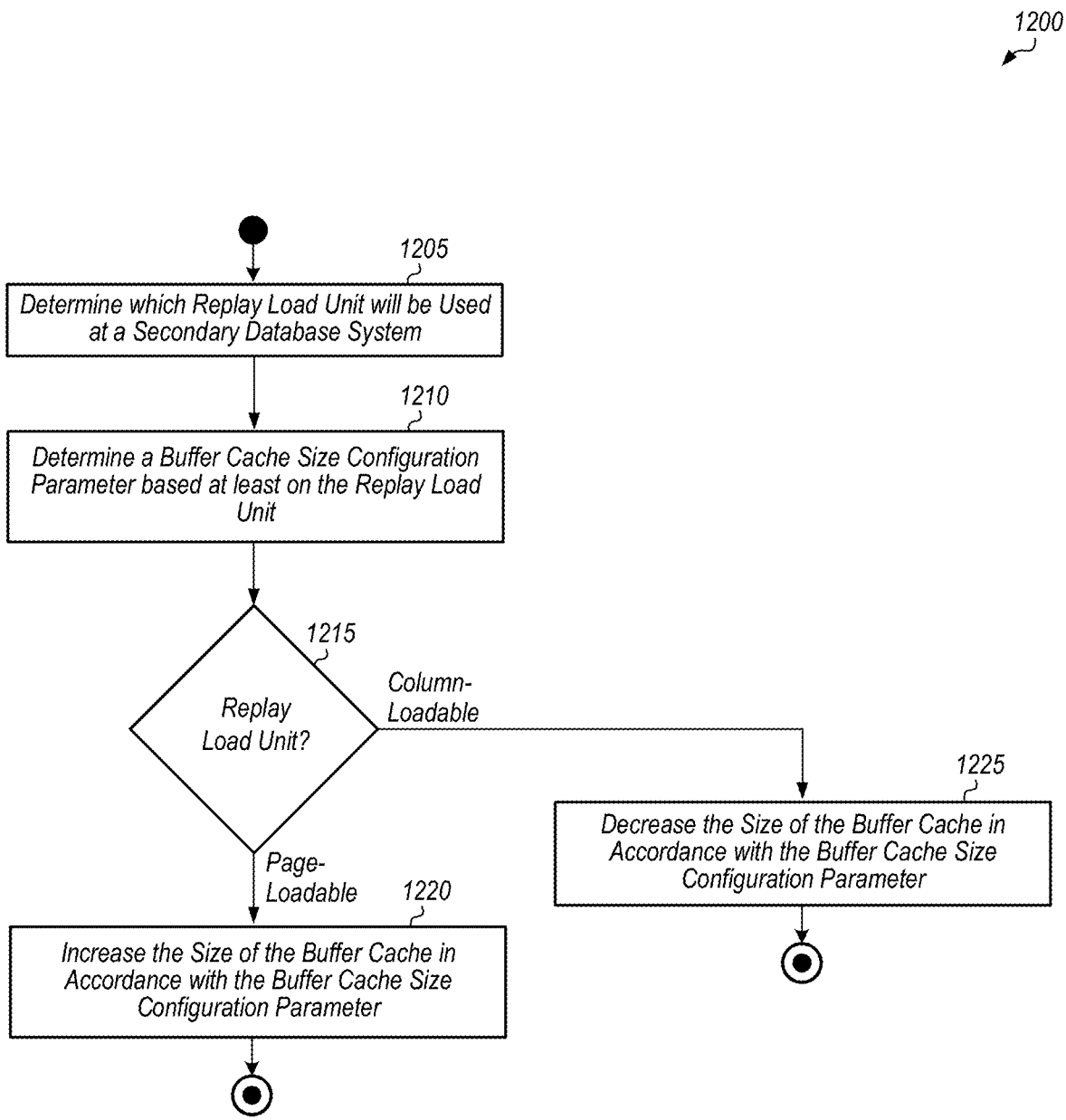
FIG. 12 illustrates an example of a process for adjusting a buffer cache size at a secondary database system based at least on a log replay configuration parameter, in accordance with some example implementations of the current subject matter.

Turning now to FIG. 12, a process is depicted for adjusting a buffer cache size at a secondary database system based at least on a log replay configuration parameter. A secondary database system determines which replay load unit will be used for loading database objects into an in-memory store at the secondary database system when replaying logs generated at a primary database system (block 1205). Also, the secondary database system determines a buffer cache size configuration parameter based at least on the replay load unit (block 1210). In an example, if the replay load unit is the page-loadable load unit, then the buffer cache size configuration parameter is set to a maximum value. If the replay load unit is set to page-loadable (conditional block 1215, "page-loadable" leg), then the secondary database system increases the size of the buffer cache (e.g., buffer cache 233 of FIG. 2) in accordance with the buffer cache size configuration parameter (block 1220). Alternatively, in block 1220, the secondary database system may set the size of the buffer cache to a first capacity which is a relatively high capacity. Otherwise, if the replay load unit is set to column-loadable (conditional block 1215, "column-loadable" leg), then the secondary database system decreases the size of the buffer cache in accordance with the buffer cache size configuration parameter (block 1225). Alternatively, in block 1225, the secondary database system may set the size of the buffer cache to a second capacity which is a relatively low capacity, with the second capacity being less than the first capacity used in block 1220. After blocks 1220 and 1225, method 1200 ends.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable storage medium" refers to any computer program product, apparatus and/or device, such as for example magnetic discs, optical disks, memory, and Programmable Logic Devices (PLDs), used to provide machine instructions and/or data to a programmable processor, including a machine-readable storage medium that receives program instructions as a machine-readable signal. The term "machine-readable signal" refers to any signal used to provide machine instructions and/or data to a programmable processor. The machine-readable storage medium can store such program instructions non-transitorily, such as for example as would a non-transient solid state memory or a magnetic hard drive or any equivalent storage medium. The machine-readable storage medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A method, comprising: receiving, by a secondary database system, data being replicated from a primary database system; receiving, by the secondary database system, a first log which captures at least one database object being loaded according to a first format into a primary in-memory store at the primary database system; determining a value of a log replay configuration parameter; and replaying the first log on the secondary database system to load the at least one database object into a secondary in-memory store according to a second format responsive to the log replay configuration parameter having a first value.

Example 2: The method of Example 1, further comprising: detecting a failover condition; initiating, at the secondary database system, a first failover reload script responsive to detecting the failover condition; unloading the at least one database object from the secondary in-memory store; and reloading the at least one database object into the secondary in-memory store according to the first format.

Example 3: The method of any of Examples 1-2, wherein the second format is different from the first format.

Example 4: The method of any of Examples 1-3, wherein the first format is a column-loadable format.

Example 5: The method of any of Examples 1-4, wherein the second format is a page-loadable format.

Example 6: The method of any of Examples 1-5, wherein for the page-loadable format, only pages relevant to a corresponding query are loaded into the in-memory store.

Example 7: The method of any of Examples 1-6, wherein for the column-loadable format, an entirety of a corresponding database object is loaded into the in-memory store.

Example 8: The method of any of Examples 1-7, wherein the column-loadable format comprises having a data subcomponent, a dictionary subcomponent, and an index subcomponent of a corresponding database object serialized together into a single page chain, and wherein the page-loadable format comprises having a separate page chain for each of the data subcomponent, the dictionary subcomponent, and the index subcomponent of a first database object.

Example 9: The method of any of Examples 1-8, further comprising replaying the first log on the secondary database system to load the at least one database object into the secondary in-memory store according to the first format responsive to the log replay configuration parameter having a second value.

Example 10: The method of any of Examples 1-9, further comprising replaying a second log on the secondary database system to load at least a second database object into the secondary in-memory store according to a same format as was used in the primary in-memory store responsive to the log replay configuration parameter having a third value.

Example 11: A system, comprising: at least one processor; and at least one memory including program instructions which when executed by the at least one processor causes operations comprising: receiving, by a secondary database system, data being replicated from a primary database system; receiving, by the secondary database system, a first log which captures at least one database object being loaded according to a first format into a primary in-memory store at the primary database system; determining a value of a log replay configuration parameter; and replaying the first log on the secondary database system to load the at least one database object into a secondary in-memory store according to a second format responsive to the log replay configuration parameter having a first value.

Example 12: The system of Example 11, wherein the program instructions are further executable by the at least one processor to cause operations comprising: detecting a failover condition; initiating, at the secondary database system, a first failover reload script responsive to detecting the failover condition; unloading the at least one database object from the secondary in-memory store; and reloading the at least one database object into the secondary in-memory store according to the first format.

Example 13: The system of any of Examples 11-12, wherein the second format is different from the first format.

Example 14: The system of any of Examples 11-13, wherein the first format is a column-loadable format.

Example 15: The system of any of Examples 11-14, wherein the second format is a page-loadable format.

Example 16: The system of any of Examples 11-15, wherein for the page-loadable format, only pages relevant to a corresponding query are loaded into the in-memory store.

Example 17: The system of any of Examples 11-16, wherein for the column-loadable format, an entirety of a corresponding database object is loaded into the in-memory store.

Example 18: The system of any of Examples 11-17, wherein the column-loadable format comprises having a data subcomponent, a dictionary subcomponent, and an index subcomponent of a corresponding database object serialized together into a single page chain.

Example 19: The system of any of Examples 11-18, wherein the page-loadable format comprises having a separate page chain for each of the data subcomponent, the dictionary subcomponent, and the index subcomponent of a first database object.

Example 20: A non-transitory computer readable medium storing instructions, which when executed by at least one data processor, cause operations comprising: receiving, by a secondary database system, data being replicated from a primary database system; receiving, by the secondary database system, a first log which captures at least one database object being loaded according to a first format into a primary in-memory store at the primary database system; determining a value of a log replay configuration parameter; and replaying the first log on the secondary database system to load the at least one database object into a secondary in-memory store according to a second format responsive to the log replay configuration parameter having a first value.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method comprising:
  receiving, by a secondary database system, data being replicated from a primary database system;
  receiving, by the secondary database system, a first log which captures at least one database object being loaded according to a first format into a primary in-memory store at the primary database system;

determining a value of a log replay configuration parameter;

replaying the first log on the secondary database system to load the at least one database object into a secondary in-memory store according to a second format responsive to the log replay configuration parameter having a first value;

detecting a failover condition;

initiating, at the secondary database system, a first failover reload script responsive to detecting the failover condition;

unloading the at least one database object from the secondary in-memory store; and reloading the at least one database object into the secondary in-memory store according to the first format.

2. The method of claim 1, wherein the second format is different from the first format.

3. The method of claim 1, wherein the first format is a column-loadable format.

4. The method of claim 3, wherein the second format is a page-loadable format.

5. The method of claim 4, wherein for the page-loadable format, only pages relevant to a corresponding query are loaded into the in-memory store.

6. The method of claim 5, wherein for the column-loadable format, an entirety of a corresponding database object is loaded into the in-memory store.

7. The method of claim 6, wherein the column-loadable format comprises having a data subcomponent, a dictionary subcomponent, and an index subcomponent of a corresponding database object serialized together into a single page chain, and wherein the page-loadable format comprises having a separate page chain for each of the data subcomponent, the dictionary subcomponent, and the index subcomponent of a first database object.

8. The method of claim 1, further comprising replaying the first log on the secondary database system to load the at least one database object into the secondary in-memory store according to the first format responsive to the log replay configuration parameter having a second value.

9. The method of claim 1, further comprising replaying a second log on the secondary database system to load at least a second database object into the secondary in-memory store according to a same format as was used in the primary in-memory store responsive to the log replay configuration parameter having a third value.

10. A system, comprising:
at least one processor; and
at least one memory including program instructions which when executed by the at least one processor causes operations comprising:
receiving, by a secondary database system, data being replicated from a primary database system;
receiving, by the secondary database system, a first log which captures at least one database object being loaded according to a first format into a primary in-memory store at the primary database system;
determining a value of a log replay configuration parameter;
replaying the first log on the secondary database system to load the at least one database object into a secondary in-memory store according to a second format responsive to the log replay configuration parameter having a first value;
detecting a failover condition;
initiating, at the secondary database system, a first failover reload script responsive to detecting the failover condition;
unloading the at least one database object from the secondary in-memory store; and
reloading the at least one database object into the secondary in-memory store according to the first format.

11. The system of claim 10, wherein the second format is different from the first format.

12. The system of claim 10, wherein the first format is a column-loadable format.

13. The system of claim 12, wherein the second format is a page-loadable format.

14. The system of claim 13, wherein for the page-loadable format, only pages relevant to a corresponding query are loaded into the in-memory store.

15. The system of claim 14, wherein for the column-loadable format, an entirety of a corresponding database object is loaded into the in-memory store.

16. The system of claim 15, wherein the column-loadable format comprises having a data subcomponent, a dictionary subcomponent, and an index subcomponent of a corresponding database object serialized together into a single page chain.

17. The system of claim 16, wherein the page-loadable format comprises having a separate page chain for each of the data subcomponent, the dictionary subcomponent, and the index subcomponent of a first database object.

18. A non-transitory computer readable storage medium storing instructions, which when executed by at least one data processor, cause operations comprising:
receiving, by a secondary database system, data being replicated from a primary database system;
receiving, by the secondary database system, a first log which captures at least one database object being loaded according to a first format into a primary in-memory store at the primary database system;
determining a value of a log replay configuration parameter;
replaying the first log on the secondary database system to load the at least one database object into a secondary in-memory store according to a second format responsive to the log replay configuration parameter having a first value;
detecting a failover condition;
initiating, at the secondary database system, a first failover reload script responsive to detecting the failover condition;
unloading the at least one database object from the secondary in-memory store; and
reloading the at least one database object into the secondary in-memory store according to the first format.

* * * * *